(12) United States Patent
Poyourow et al.

(10) Patent No.: US 7,577,674 B2
(45) Date of Patent: Aug. 18, 2009

(54) SMART STORE AND FORWARD DBMS STATEMENT COLLATING SYSTEM

(75) Inventors: Dave Poyourow, Los Angeles, CA (US); Dave Sullivan, Canoga Park, CA (US); Zheng Liu, San Gabriel, CA (US)

(73) Assignee: SAP, Aktiengesellschaft, Walldorf (DE)

( * ) Notice: Subject to any disclaimer, the term of this patent is extended or adjusted under 35 U.S.C. 154(b) by 289 days.

(21) Appl. No.: 11/772,373

(22) Filed: Jul. 2, 2007

(65) Prior Publication Data

US 2009/0012962 A1 Jan. 8, 2009

(51) Int. Cl.
G06F 17/30 (2006.01)
(52) U.S. Cl. ...................................... 707/101
(58) Field of Classification Search ................ 707/1–3, 707/6, 10, 100, 101
See application file for complete search history.

(56) References Cited

U.S. PATENT DOCUMENTS

| | | | |
|---|---|---|---|
| 6,173,278 B1 * | 1/2001 | Rothschild ..................... 707/1 |
| 7,114,027 B2 * | 9/2006 | Gilfix et al. .................. 707/101 |
| 7,443,321 B1 * | 10/2008 | Kaufman et al. .............. 341/87 |
| 2002/0138460 A1 * | 9/2002 | Cochrane et al. ................ 707/1 |
| 2005/0091234 A1 * | 4/2005 | Hsu et al. .................... 707/100 |

* cited by examiner

Primary Examiner—Mohammad Ali
Assistant Examiner—Marc R Filipczyk
(74) Attorney, Agent, or Firm—Dalina Law Group, P.C.

(57) ABSTRACT

One or more embodiments of the invention enable a smart store and forward DBMS statement collating system. The system may be utilized with any database implementation by coupling computer readable program code to the interface layer of the database, generally the lowest layer of software that accesses the database. The system can be utilized with complex transactional code that insulates a user from programming complex collating logic. Hence a user that employs an embodiment of the system is unaware that database operations within a transaction are collated into silos with like table and field usage and flushed to the database as part of a database block operation. The order in which operations occur allows for high priority table inserts to occur before low priority table inserts to maintain referential integrity, while low priority table deletes occur before high priority table deletes for the same reason.

19 Claims, 7 Drawing Sheets

Figure 3

| | | | | | |
|---|---|---|---|---|---|
| X1 | INSERT | Products | SKU=555 | PRICE=$1,234.56 | QTY=2 | COLOR=RED |
| Y | UPDATE | Products | ... | | | |
| Z1 | UPDATE | Manufacturer | Name=xx | Address=1234 Main Street | | |
| X2 | INSERT | Products | SKU=444 | PRICE=$987.65 | QTY=1 | COLOR=BLUE |
| Z2 | UPDATE | Manufacturer | Name=yy | Address=7910 Ivanhoe Ave | | |

| | | | | | |
|---|---|---|---|---|---|
| INSERT | Products | SKU=555 | PRICE=$1,234.56 | QTY=2 | COLOR=RED |
| INSERT | Products | SKU=444 | PRICE=$987.65 | QTY=1 | COLOR=BLUE |

| | | |
|---|---|---|
| DELETE | Manufacturer | ID=abc |

| | | | |
|---|---|---|---|
| UPDATE | Manufacturer | Name=xx | Address=1234 Main Street |
| UPDATE | Manufacturer | Name=yy | Address=7910 Ivanhoe Ave |

206

X
Y
Z

SMART STORE AND FORWARD DBMS STATEMENT COLLATING SYSTEM

BACKGROUND OF THE INVENTION

1. Field of the Invention

Embodiments of the invention described herein pertain to the field of computer systems. More particularly, but not by way of limitation, one or more embodiments of the invention enable a smart store and forward DBMS statement collating system that collates like database operations into block operations associated with particular tables and sets of fields that are then delivered to a database thereby greatly increasing performance.

2. Description of the Related Art

There are currently no known systems that automatically collate randomly ordered database operations into database block operations while retaining transactional coherency. Generalized systems that accept database operations in a random fashion with respect to tables and fields accessed do not collate and forward block operations to a database since it is assumed that with random orders of commands, no performance increase in general is possible. Furthermore, due to the random order of database insert, delete and update operations, known products assume that block operations are in general not possible for all combinations of database operation orderings. Known systems simply delivery the database operations in the order in which they arrive in order to maintain data and transactional integrity in the simplest fashion.

To increase performance, current systems require transaction originators to manually aggregate database operations into block operations themselves. This allows the users to defeat the internal inefficiencies of known DBMSs by aggregating like commands operating on the same table and fields. This requires user level programming to order and collate operations that utilize particular tables and particular sets of fields within the tables. This collating procedure requires significant effort to analyze and collate like database operations while maintaining transactional integrity and is beyond the scope of what most database programmers are enlisted to accomplish.

DBMS batch operations do not allow for automated statement collating, so depending on the batch operations and order thereof, the database operations are generally inefficient. For example, due to table interleaving significant delays are normally encountered with randomly ordered sets of database operations on interleaved tables. In addition, LOB operations are not handled in a batch nor can they be performed with memory binding. In effect there is little difference between one-by-one database operation execution and batch operation execution of unordered sets of database operations.

Although memory binding avoids text-based operations on client computers and parsing on server computers, the order of performance increase is a few percent at best. In effect, without ordering database operations into blocks there is no great gain in efficiency through use of binding.

For at least the limitations described above there is a need for a smart store and forward DBMS statement collating system.

BRIEF SUMMARY OF THE INVENTION

One or more embodiments of the invention enable a smart store and forward DBMS statement collating system. The system can be utilized with complex transactional code that insulates a user from programming complex collating logic. The system may be utilized with any database implementation by coupling computer readable program code to the interface layer of the database, generally the lowest layer of software that accesses the database. Hence a user that employs an embodiment of the system is unaware that database operations within a transaction are collated into silos with like table and field usage and flushed to the database as part of a database block operation. The system allows the program to supply a function that specifies the order by which tables are processed.

Generating a database block operation occurs when a transaction is complete, or when the number of database operations for a database block operation hits a predefined threshold or when a database select operation occurs that involves a particular table for example. The incoming database operations are grouped through a signature that is generated according to the table and set of fields associated with an operation. In one or more embodiments, multiple silos store database operations wherein each silo is associated with a particular type of database operation. In other embodiments, silos may be configured with finer granularity, for example based on a table. Regardless of the granularity of the silos, when at least two incoming operations are accepted as part of a transaction and a signature is generated for each accepted database operation and database operations having a particular signature are stored in a silo and a database block operation is generated for like signatures, then embodiments of the invention provide large performance increases.

In one or more embodiments, the signature may be generated by concatenating the table name and set of field names in a text string, optionally with the operation name. Any other method of collating database operations that utilize a given table and set of fields is in keeping with the spirit of the invention.

In one or more embodiments, tables may be selectively designated as utilizing the system while other tables that are known to have random order of operations and interleaved table utilization may be configured to bypass the system and directly access the database. As the interface layer to the database may be instrumented to utilize embodiments of the invention, a concise set of silo operations such as open_silo, close_silo, add_to_silo, remove_from_silo and flush_silo may be utilized to control and manipulate database operations stored in the silo(s). Embodiments of the invention greatly increase performance where an orderly methodology of creating, defining and utilizing tables is known. Specifically, good candidates for employing embodiments of the invention include scenarios where tables are operated on with delete, insert and update operations in that order and/or when sets of fields associated with database operations are routinely utilized.

Different database implementations provide different factors with which to perform generate operations in an optimal manner. For example, some databases provide higher performance if 512 operations are aggregated while other databases provide higher performance when 2048 operations are aggregated. In any manner so long as at least two operations are collated, the performance nearly doubles since so much overhead is avoided on a per operation basis. As the number of database operations formed into a database block operation increases, the overall system performance continues to increase asymptotically up to higher thresholds as detailed above. Hence as long as there are database operations of two or more per transaction that may be paired, significant performance increases are achieved using embodiments of the invention.

BRIEF DESCRIPTION OF THE DRAWINGS

The above and other aspects, features and advantages of the invention will be more apparent from the following more particular description thereof, presented in conjunction with the following drawings wherein:

FIG. 3 is a close up view of the incoming database operations of FIG. 2.

FIG. 6 is a close up view of the database block operations of FIG. 2.

DETAILED DESCRIPTION

A smart store and forward DBMS statement collating system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
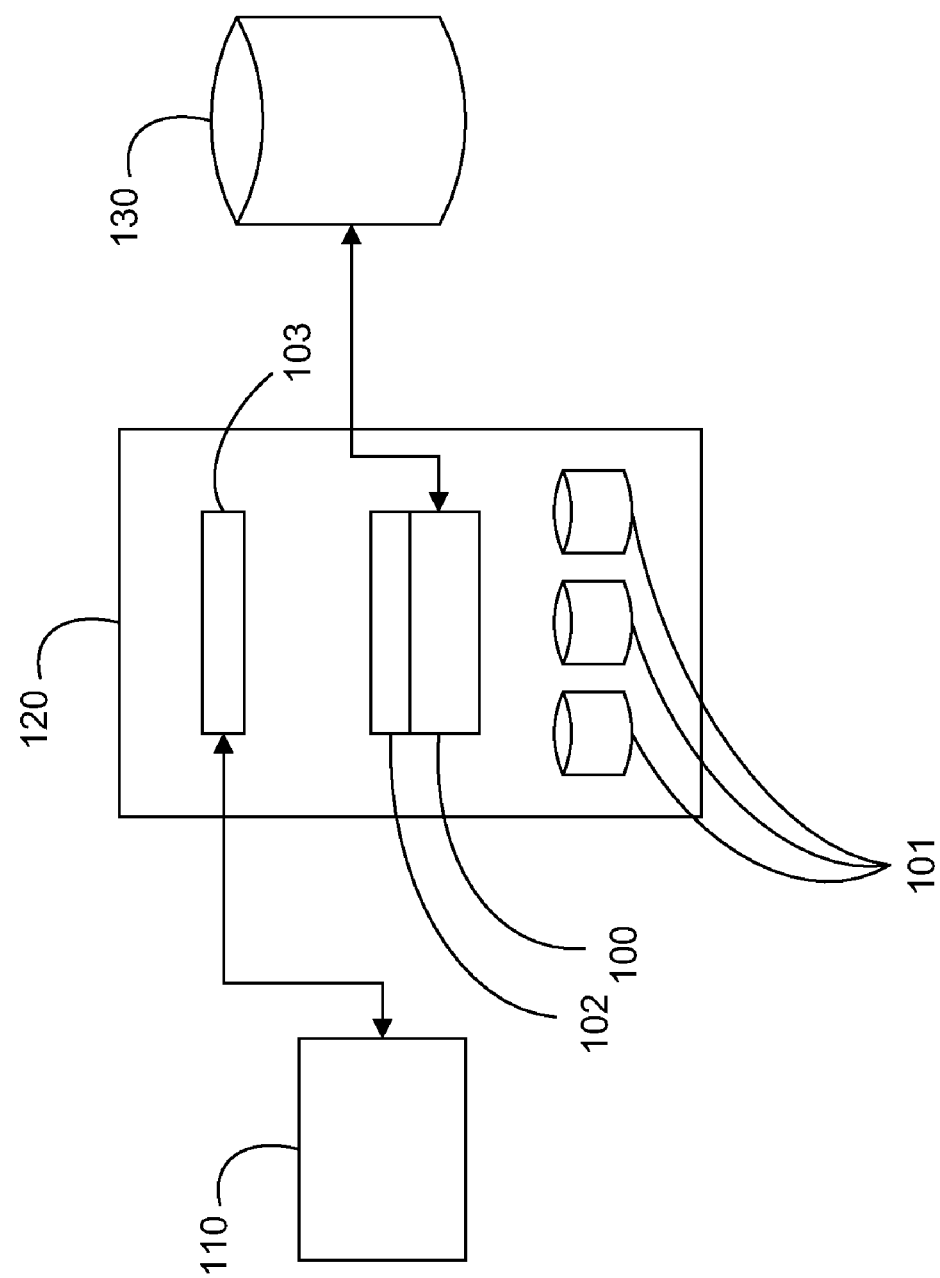
FIG. 1 is an architectural view of the system.

FIG. 1 is an architectural view of the system. Embodiments of computer readable program code 100 collate incoming database operations into silos 101. Computer readable program code 100 couples with database access layer 102. Database access layer is in general the lowest layer of database application programmer's interface (API) 103, but is not required to reside or couple with any particular database software level. Server 120 hosts computer readable program code 100 and accepts incoming database operations from client computer 110. Database 130 holds relevant tables, fields and data and is forwarded database block operations from server 120.

The system may be utilized with any database implementation from any vendor by coupling computer readable program code to the interface layer of the database, generally the lowest layer of software that accesses the database. Computer readable code 100 may couple with database access layer 102 or may alternatively couple to any other programming level so long as the user of DB API 103 is not required to instruct, interface or in any other way control computer readable code 100. The system can be utilized with complex transactional code that insulates a user from programming complex collating logic. Hence, a user that employs an embodiment of the system is unaware that database operations within a transaction are collated into silos with like table and field usage and flushed to the database as part of a database block operation. Specifically, a user that programs database API 103 is insulated from computer readable code 100 and is not required to modify any software or code in order to use embodiments of the system.

Different database implementations provide different factors with which to perform generate operations in an optimal manner. For example, some databases provide higher performance if 512 operations are aggregated while other databases provide higher performance when 2048 operations are aggregated. In any manner so long as at least two operations are collated, the performance nearly doubles since so much overhead is avoided on a per operation basis. As the number of database operations formed into a database block operation increases, the overall system performance continues to increase asymptotically up to higher thresholds as detailed above. Hence as long as there are database operations of two or more per transaction that may be paired, significant performance increases are achieved using embodiments of the invention.

Figure 2:
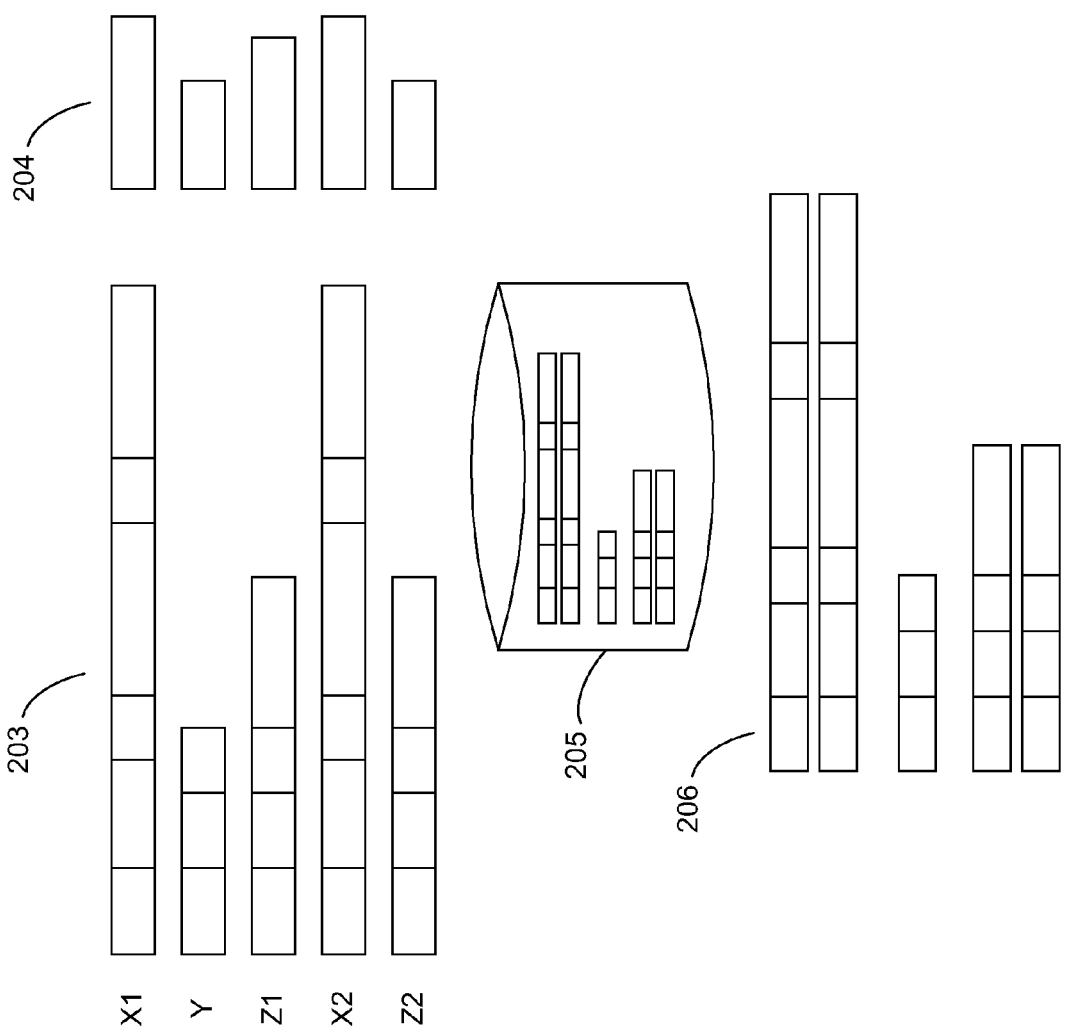
FIG. 2 is an overview of the acceptance of database operations, generation of signatures, collation of similar operations into silos and generation of database block operations.

FIG. 2 is an overview of the acceptance of database operations, generation of signatures, collation of similar operations and storage of the collated database operations into silos and generation of database block operations. Incoming database operations 203 include database operations delete, insert and update that are part of a transaction. Signatures 204 correspond to the individual incoming database operations and associated parameters. Silos 205 are utilized to store incoming database operations 203 indexed by signatures 204. Database block operations 206 are generated based on the signatures under various conditions and flushed to database 130 (as per FIG. 1).

FIG. 3 is a close up view of incoming database operations 203 of FIG. 2. Database operations 203 form part of a transaction. As shown incoming database operations X1, Y, Z1, X2, Z2 and X3 include various delete, insert and update database operations that include table names and a number of fields shown individually to the right in the written page. For example, X1 includes a database operation (for example insert), a table name (for example the "Products" table) and 4 other fields and associated values (for example SKU, price, quantity and color along with associated values). Likewise X2 includes a database operation (for example update), with the same table name and parameters as X1. In addition, the two update commands likewise share the same table (for example the "Manufacturers" table) and parameters (for example the name and address of the manufacturer).

Figure 4:
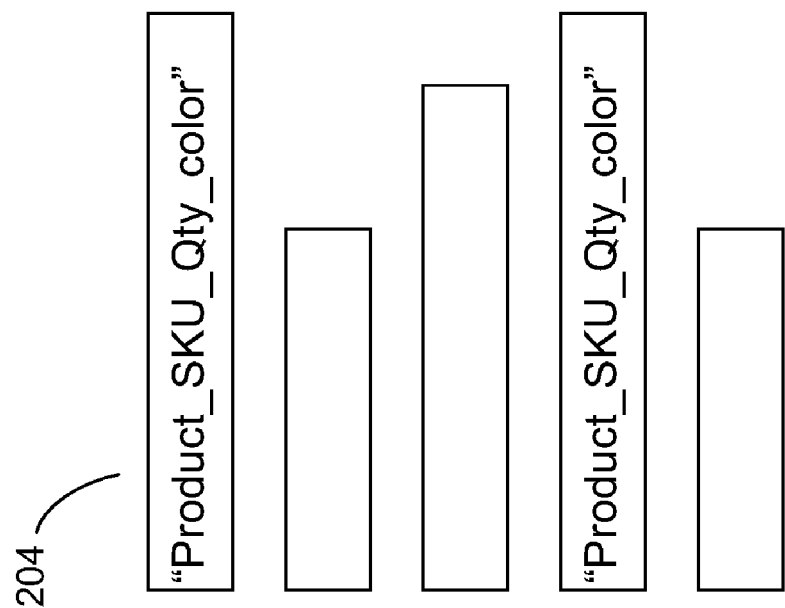
FIG. 4 is a close up view of the generation of signatures of FIG. 2.

FIG. 4 is a close up view of signatures 204 of FIG. 2. The incoming database operations are collated via a signature that is generated according to the table and set of fields associated with an operation. In one or more embodiments, the signature may be generated by concatenating the table name and set of field names in a text string, optionally with the operation name. Any other method of collating database operations that utilize a given table and set of fields is in keeping with the spirit of the invention. As shown signature 401 is a text concatenation of "product", "SKU", "qty" and "color", e.g., "product_SKU_qty_color". This may be used as a key or in combination with any other data structure such as a hash in order to access like database operations.

Figure 5:
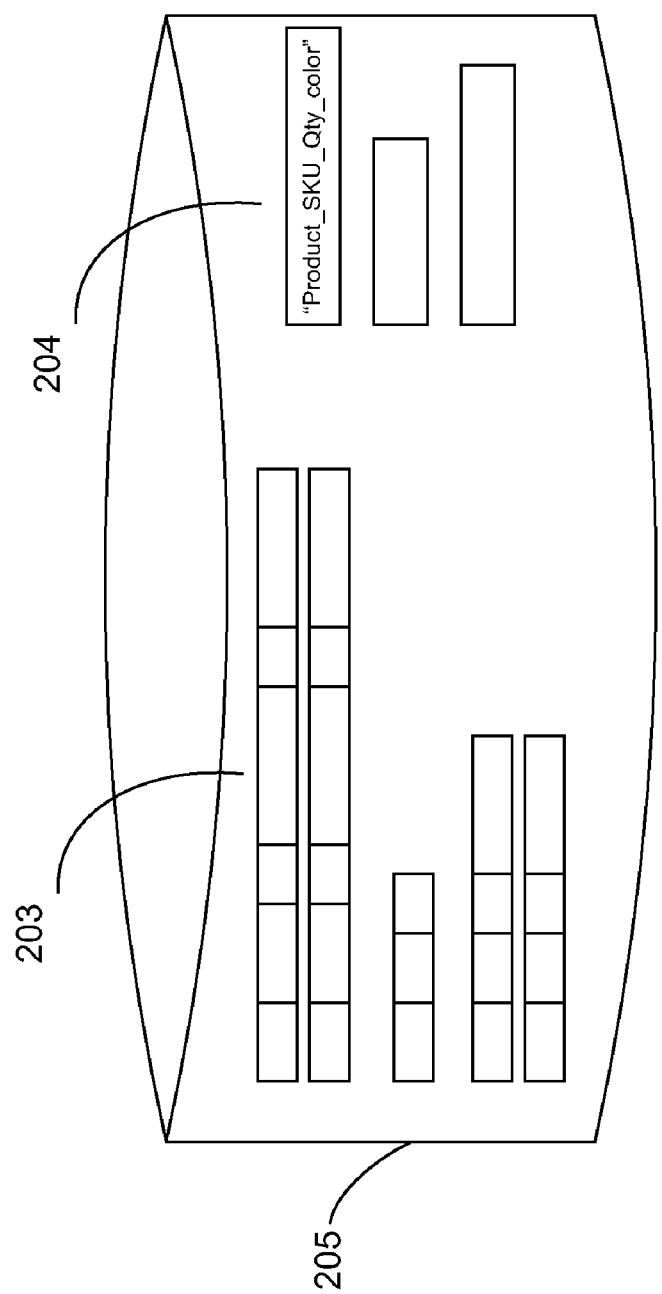
FIG. 5 is a close up view of the silos of FIG. 2.

FIG. 5 is a close up view of silos 205 of FIG. 2. Any type of data structure may be utilized to store incoming database operations 203. In one or more embodiments an associative array, or any other type of structure that allows for the insertion and access of incoming database operations via signatures 204. In one or more embodiments, multiple silos store database operations wherein each silo is associated with a particular type of database operation. In other embodiments, silos may be configured with finer granularity, for example based on a table. Regardless of the granularity of the silos, when at least two incoming operations are accepted as part of a transaction and a signature is generated for each accepted database operation and database operations having a particular signature are stored in a silo and a database block operation is generated for like signatures, then embodiments of the invention provide large performance increases. As shown in FIG. 5, as long as database operations 203 are accessible via signatures 204, any data structure type may be utilized to implement silo 205.

FIG. 6 is a close up view of the database block operations of FIG. 2. Although the incoming database operations may be in any order, the database block operations are generated according to table and field access so as to form a rectangular database block instruction. By flushing a database block operation to database 130, great amounts of overhead on a per-database operation are eliminated. The subsequent performance gain is large and increases asymptotically as the number of collated database operations increases. Performance increases of two orders of magnitude are thus achieved in many scenarios. Generating a database block operation occurs when a transaction is complete, or when the number of database operations for a database block operation hits a predefined threshold or when a database select operation occurs that involves a particular table for example. As shown in FIG. 6, like commands are formed into block operations X and Z although operation Y does not have any companion operations with which to form a database block operation and so is flushed as a single operation to the database.

The order in which collated operations are forwarded in database block operations to database 130 is generally for high priority table inserts to be forwarded before low priority table inserts to maintain referential integrity. Similarly, low priority table deletes are collated and forwarded to database 130 so as to occur before high priority table deletes in order to maintain referential integrity. For example, if records in a second table require records in a first table to exist before being inserted then the database will not allow the block command to be performed on the second table since referential integrity would be violated if the required records in the first table do not exist. Hence, any tables operations that depend on the Products table existing must be issued after database block operation X (for example a Product options table operation that depends on the SKU field). Optionally, a priority value may be maintained in the silo for each signature so that dependencies known from the schema may be readily utilized to order the blocks X, Y and Z when flushing blocks X, Y and Z to the database. Any other method of notating and keeping track of the order in which to issue database block operations based on the related fields of a database schema are in keeping with the spirit of the invention.

In one or more embodiments, tables may be selectively designated as utilizing the system while other tables that are known to have random order of operations and interleaved table utilization may be configured to bypass the system and directly access the database. As the interface layer to the database may be instrumented to utilize embodiments of the invention, a concise set of silo operations such as open_silo, close_silo, add_to_silo, remove_from_silo and flush_silo may be utilized to control and manipulate database operations stored in the silo(s). Embodiments of the invention greatly increase performance where an orderly methodology of creating, defining and utilizing tables is known. Specifically, good candidate scenarios for employing embodiments of the invention include scenarios where tables are operated on with delete, insert and update operations in a generally consistent order and/or when repeated sets of fields associated with database operations are routinely utilized with multiple database operations as part of a transaction.

Figure 7:
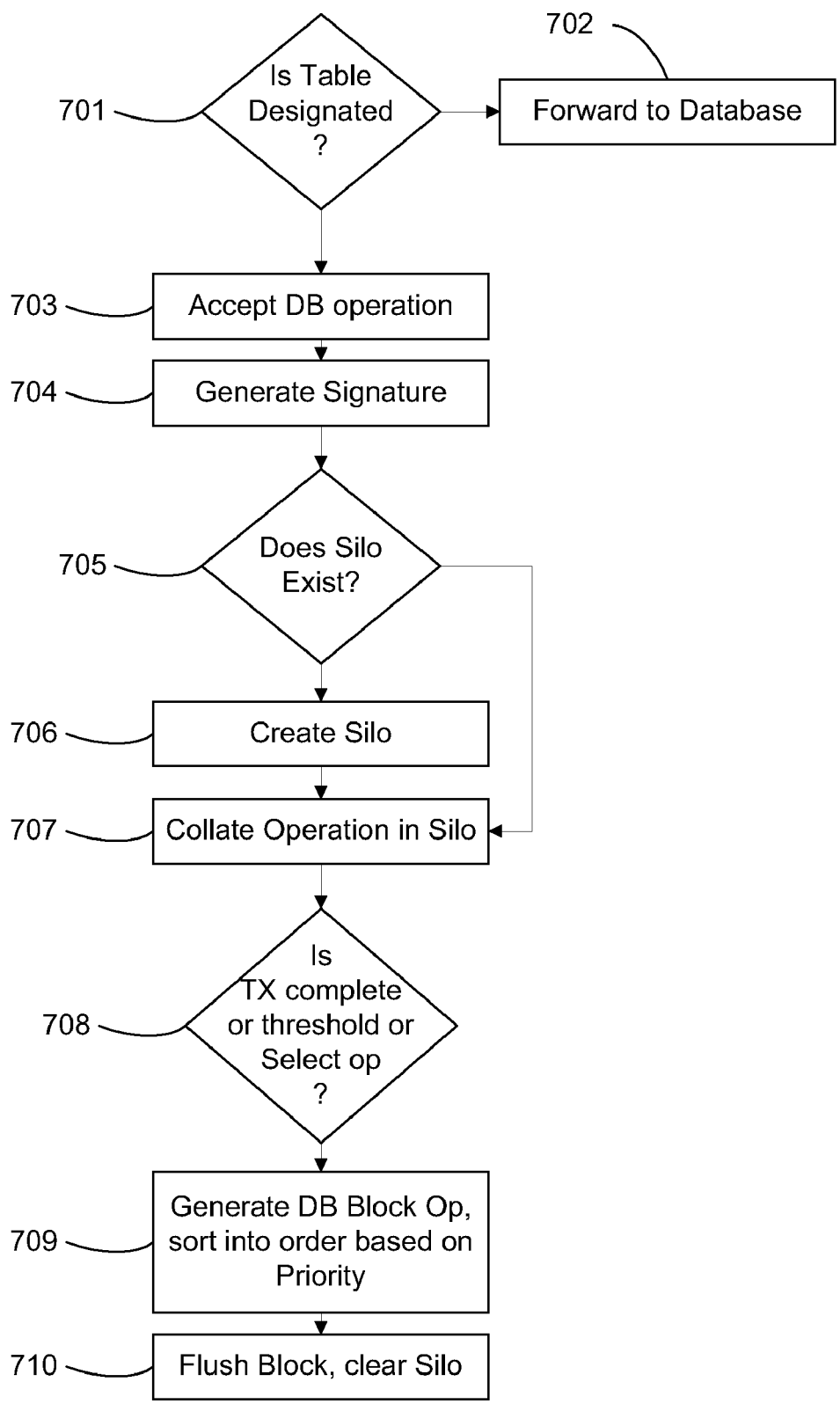
FIG. 7 is a flow chart detailing operation of an embodiment of the system.

FIG. 7 is a flow chart detailing operation of an embodiment of the system. If a table has been designated to utilize an embodiment of the invention, as per 701 then processing continues to 703. If not, then the incoming database operation is forwarded directly to the database at 702. For tables that are utilized in an ad hoc manner where operation order and consistent use of fields is known to not occur, bypassing embodiments of the invention allow for standard use of the database. The incoming database operation that is part of a transaction is accepted at 703. A signature is generated at 704 that allows for the identification and further indexing of the incoming database operation after it is stored in a silo. At this time, the priority may be optionally assigned to the signature if the signature does not already exist in the silo. The priority may form part of the signature or exist as a separate structure. The priority may be generated via the database schema for example to indicate which tables depend on each other. Any other method of designating a priority for a database operation that references a table where a known schema for the database exists is in keeping with the spirit of the invention. If a silo is not present at 705, then it is created at 706. The silo can be any type of data structure capable of holding a signature and associated database operation. If the silo exists as per 705, then the incoming database operation is collated into the silo at 707. This allows for operations that utilize a given table and set of fields to be formed into a database block operation. If the incoming operation is a database select on a given table, or if the transaction is complete, or if a threshold number of collated database operations are in the silo as per 708, then a database block operation is created at 709 and the order of any higher or lower priority database block operations is utilized to order the generated database block operations so as to maintain referential integrity and flush the database block operations at 709. The silo is cleared and a return result is provided.

While the invention herein disclosed has been described by means of specific embodiments and applications thereof, numerous modifications and variations could be made thereto by those skilled in the art without departing from the scope of the invention set forth in the claims.

What is claimed is:

1. A smart store and forward DBMS statement collating computer program product comprising a computer usable memory medium having computer readable program code embodied therein wherein said computer readable program code is configured to:

accept a plurality of database operations on a second computer associated with a database wherein said plurality of database operations are part of a transaction wherein said plurality of database operations are initiated from a first computer;

generate a signature based on a first database operation selected from said plurality of database operations wherein said first database operation is associated with a first table and at least one first field associated with said first table, wherein said signature is formed by concatenating a text representation of said first database operation and said first table and said at least one first field;

collate said first database operation in a silo wherein said silo is indexed by said signature; and, generate a database block operation comprising a second plurality of database operations having said signature wherein said second plurality of database operations are associated with said silo and flush said database block operation to said database associated with said second computer.

2. The computer program product of claim 1 wherein said generate occurs when said transaction is complete.

3. The computer program product of claim 1 wherein said generate occurs when a number of said second plurality of database operations hits a threshold.

4. The computer program product of claim 1 wherein said generate occurs when said a select operation occurs with said signature.

5. The computer program product of claim 1 wherein said computer program product further comprises a second silo and a third silo wherein said silo holds delete operations, said second silo holds insert operations and said third silo holds update operations.

6. The computer program product of claim 1 wherein said database block operation includes insert database operations that access a highest priority table that are asserted before insert database operations that access a lowest priority table to maintain referential integrity.

7. The computer program product of claim 1 wherein said database block operation includes delete database operations that access a lowest priority table that are asserted before delete database operations that access a highest priority table to maintain referential integrity.

8. The computer program product of claim 1 wherein said database block operation is ordered according to operation type.

9. The computer program product of claim 1 wherein said database block operation is ordered according to operation type wherein deletes occur before inserts.

10. The computer program product of claim 1 wherein said database block operation is ordered according to operation type wherein deletes occur before inserts and wherein delete database operations access a lowest priority table before delete database operations that access a highest priority table to maintain referential integrity.

11. The computer program product of claim 1 wherein said database block operation is ordered according to operation type wherein inserts occur after deletes.

12. The computer program product of claim 1 wherein said database block operation is ordered according to operation type wherein inserts occur after deletes and wherein insert database operations access a highest priority table before insert database operations that access a lowest priority table to maintain referential integrity.

13. The computer program product of claim 1 wherein said database block operation is ordered according to operation type wherein updates occur after inserts.

14. The computer program product of claim 1 wherein said computer program product is configurable on a table by table basis to forward said first plurality of database operations to said database or to flush said second plurality of database operations to said database.

15. The computer program product of claim 1 wherein said computer readable code is associated with an interface layer to said database and wherein a user is insulated from said computer readable code therein not requiring any code modifications of user origin.

16. The computer program product of claim 1 wherein said signature is generated on said second computer.

17. A smart store and forward DBMS statement collating computer program product comprising a computer usable memory medium having computer readable program code embodied therein wherein said computer readable program code is configured to:

accept a plurality of database operations on a second computer associated with a database wherein said plurality of database operations are part of a transaction wherein said plurality of database operations are initiated from a first computer;

generate a signature based on a first database operation selected from said plurality of database operations wherein said first database operation is associated with a first table and at least one first field associated with said first table, wherein said signature is formed by concatenating a text representation of said first database operation and said first table and said at least one first field;

collate said first database operation in a silo wherein said silo is indexed by said signature;

generate a database block operation comprising a second plurality of database operations having said signature wherein said second plurality of database operations are associated with said silo and flush said database block operation to said database associated with said second computer;

said database block operation includes insert database operations that access a highest priority table that are asserted before insert database operations that access a lowest priority table to maintain referential integrity; and, said database block operation includes delete database operations that access a lowest priority table that are asserted before delete database operations that access a highest priority table to maintain referential integrity.

18. A smart store and forward DBMS statement collating computer program product comprising a computer usable memory medium having computer readable program code embodied therein wherein said computer readable program code is configured to:

accept a plurality of database operations on a second computer associated with a database wherein said plurality of database operations are part of a transaction wherein said plurality of database operations are initiated from a first computer;

generate a signature based on a first database operation selected from said plurality of database operations wherein said first database operation is associated with a first table and at least one first field associated with said first table, wherein said signature is formed by concatenating a text representation of said first database operation and said first table and said at least one first field;

collate said first database operation in a silo wherein said silo is indexed by said signature; and, generate a database block operation comprising a second plurality of database operations having said signature wherein said second plurality of database operations are associated with said silo and flush said database block operation to said database associated with said second computer wherein said database block operation is ordered according to operation type.

19. The computer program product of claim 18 wherein said database block operation is ordered by deletes that occur before inserts that occur before updates.

* * * * *